United States Patent [19]

Thomas, Jr. et al.

[11] 3,841,014
[45] Oct. 15, 1974

[54] FISHSAVING DEVICE

[76] Inventors: Thomas A. Thomas, Jr.; Frank Thomas, both of 2519 Madison, Hollywood, Fla. 33020

[22] Filed: Mar. 27, 1973

[21] Appl. No.: 345,336

[52] U.S. Cl. .............................. 43/43.16, 43/53.5
[51] Int. Cl. ............................................ A01k 83/00
[58] Field of Search ......................... 43/43.16, 53.5

[56] References Cited
UNITED STATES PATENTS

| | | | |
|---|---|---|---|
| 989,392 | 4/1911 | Mueller | 43/43.16 |
| 1,333,148 | 3/1920 | Anderson | 43/43.16 |
| 2,816,392 | 12/1957 | Goldberg et al. | 43/43.16 |
| 2,896,359 | 7/1959 | Lanthier | 43/43.16 |
| 2,990,641 | 7/1961 | Weidman | 43/43.16 |
| 3,333,359 | 8/1967 | Barker, Jr. | 43/44.8 X |

Primary Examiner—Robert Peshock
Assistant Examiner—Daniel J. Leach
Attorney, Agent, or Firm—Depaoli & O'Brien

[57] ABSTRACT

A fishsaving device, attachable to a barbed fishhook, is provided for rendering ineffective the barb of the fishhook. The device is provided in barb-inactivating forms which vary in elasticity, stiffness, and flexibility.

Each form serves to temporarily close the barb by occupying the space between the point of the barb and the bight, thereby permitting easy withdrawal of the hook from the flesh of fish or other matter.

10 Claims, 27 Drawing Figures

PATENTED OCT 15 1974 3,841,014
SHEET 3 OF 3
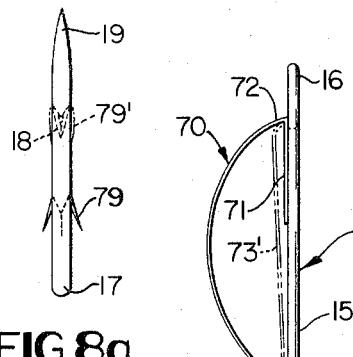
FIG. 8a
FIG. 8
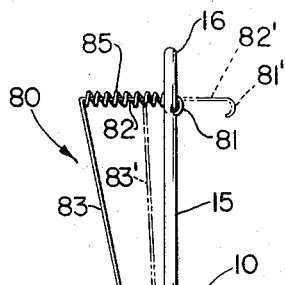
FIG. 9
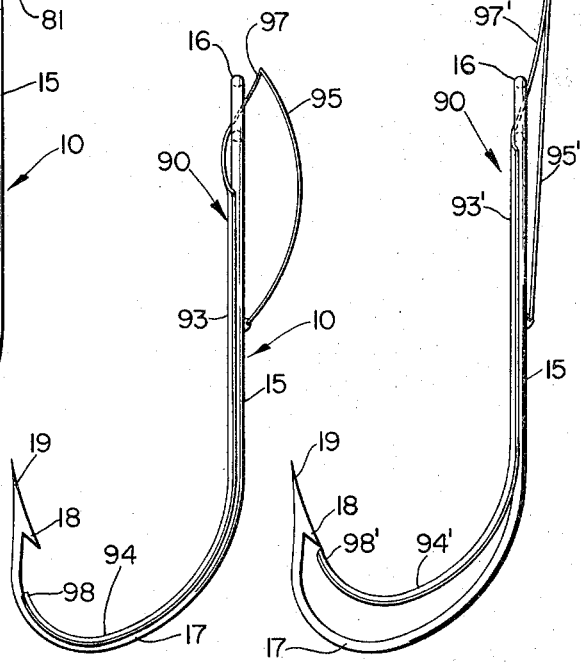
FIG. 10  FIG. 10a
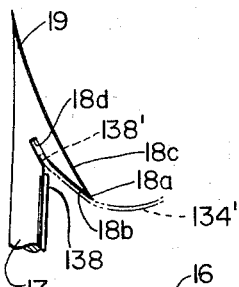
FIG. 13a
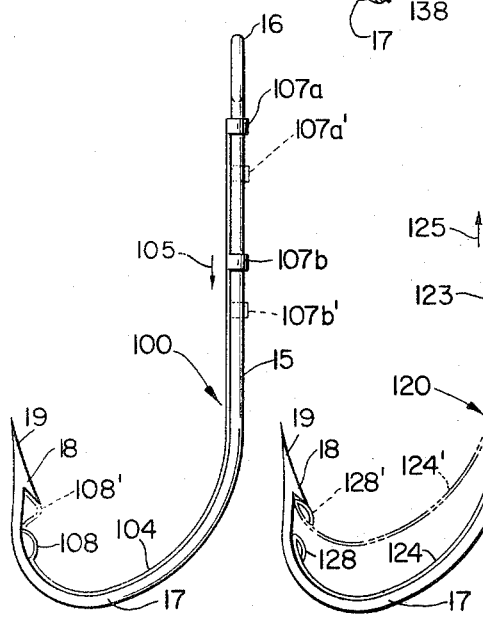
FIG. 11  FIG. 12
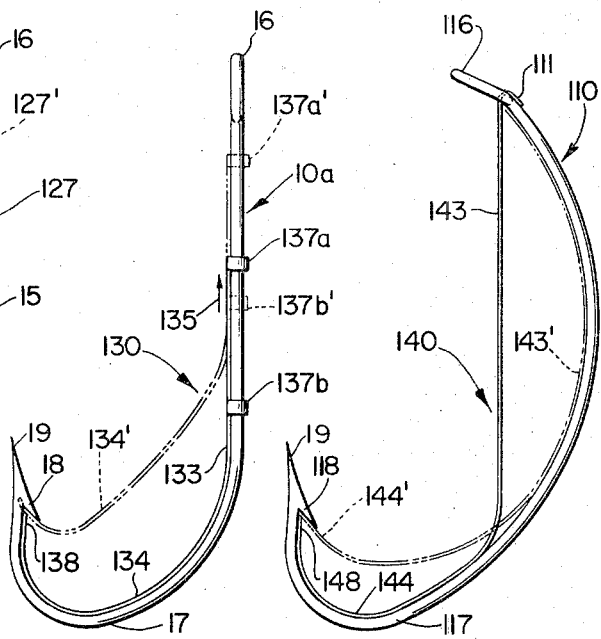
FIG. 13  FIG. 14

3,841,014

FISHSAVING DEVICE

BACKGROUND OF THE INVENTION

1. Field of the Invention

This invention relates to fishhooks and more particularly to an improved fishhook having self-contained integral means for readily removing the fishhook from the fish.

2. Description of the Prior Art

In general the typical fishhook has a shank which is provided with an eye at one end thereof for attachment to a leader. The other end of the shank leads to a loop, or bight, which terminates in a sharp point with a reversely directed barb adjacent the point. As is known, the sharp point serves to enter the flesh of the fish whereas the barb functions to retain the fish on the hook until such time as the fish is retrieved. Unfortunately, however, various problems are encountered in removing the hook from the flesh of the fish without injuring the fish and/or lacerating the hand. This is usually encountered when the fish hook and bait have been partially swallowed by the fish and the barb is caught in cartilaginous or bone-like material which resists disengagement of the barb. In the past, attempts to remove hooks have included the use of various disgorging tools as well as other bead-like arrangements placed on the shank which serve to close the barb in a mating engagement. The art has long sought a simplified and inexpensive hook which can be easily removed without requirement of tools and other complicated plier-like devices. Conservationists, in particular, strongly advocate the use of hooks which can be easily removed so that injury to fish being released is minimized. Commercial and sport fishermen who must remove barbed hooks from the mouths of large fish having powerful jaws and dangerous teeth, such as sharks, barracuda, and pike, also need a labor-saving and safety-enhancing means that can be used quickly in spite of violent movements of the freshly caught fish.

SUMMARY OF THE INVENTION

By means of the present invention there is provided a barb-inactivating device attachable to the end of the shank or to the eye of a barbed fishhook and curved so as to be accommodated along the inner side of the loop or bight and movably engage the barb thereof, thereby rendering the rear point of the barb ineffective so that the hook may be easily removed from the fish. The barb-inactivating device is provided in three forms, any being useful as a separate device attachable to a fishhook or as a fishhook member of a combined fishhook: a spring member, a rigid member, and a flexible member. These forms vary in elasticity, stiffness, and flexibility and overlap to some extent. The fishhook member broadly comprises an attachment portion for attaching the member to the shank or eye of the fishhook, a loop portion which generally conforms to the bight of the fishhook, a tip adapted to clear flesh from the barb of the fishhook, and a means for moving the tip into a barb-inactivating position.

The spring member is rigidly attached to the shank or eye of a barbed fishhook and is utilized by manually squeezing it. The rigid member and the flexible member are slidably attached to the fishhook shank and are utilized by sliding movements toward or away from the barb of the hook. Several tip embodiments for any form of the barb-inactivating device are also disclosed. Movement of the barb-inactivating member is very effective in its operation and does not interfere with the normal usefulness of the barbed hook since release of the barb-inactivating member automatically opens the barbed point to its normal position after use.

DESCRIPTION OF THE DRAWINGS

For a more complete understanding of the invention, reference is made to the accompanying drawings wherein:

FIG. 8 is a side view of a fishhook having an attached spring member which is split at its tip so that side barbs protrude when the spring member is at rest but are retracted, as shown in phantom, when the spring member is squeezed.

FIG. 8a is a front view of the hook portion of the combined fishhook of FIG. 8, showing the side barbs protruding and, in phantom, retracted.

FIG. 9 is a side view of a fishhook equipped with a rockingly operated, spring loaded, rigid member in rest position and, in phantom, in engaged position.

FIG. 10 is a side view of a fishhook having a slidingly operated rigid member which is attached by a flexible leader passed through the eye to a bent leaf spring which is pivotably attached to the rear of the shank.

FIG. 10a shows the fishhook and rigid member of FIG. 10 in engaged relationship.

FIG. 11 is a side view of a fishhook and slidingly operated flexible member, having a curved tip, in rest position and, in phantom, in engaged position.

FIG. 12 is a side view of a typical fishhook and a slidingly operated rigid member, having a bentover tip, in rest position and, in phantom, in engaged position.

FIG. 13 is a side view of a slightly altered fishhook and a slidingly operated rigid member in rest position and, in phantom, in engaged position.

FIG. 13a is a detail of the hook and barb portions of the hook thereby showing the tip portion of the rigid member in both rest and engaged positions as shown in FIG. 13.

FIG. 14 is a side view of a fishhook and a spring member in rest position and, in phantom, in engaged position.

DETAILED DESCRIPTION OF PREFERRED EMBODIMENTS

Figure 1:
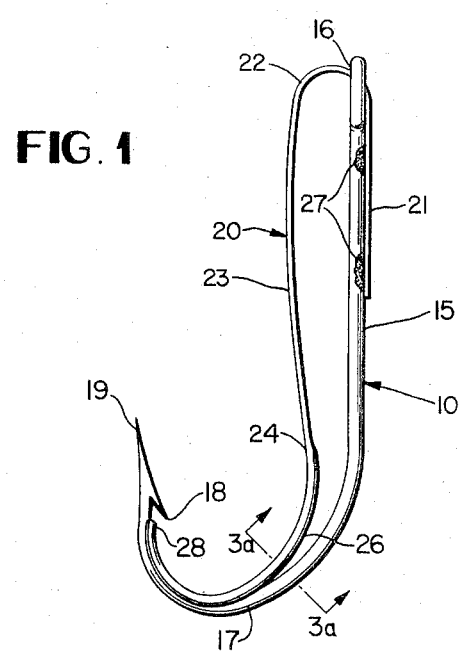
FIG. 1 is a side view of a barbed fishhook embodying a flexible spring member in normal position so that the barb of the hook is in the open position.

In reference to the drawings and the figures shown therein, the typical fishhook 10 is characterized as having a shank 15, a loop or bight 17, a sharp tip or point 19 and a barb with reverse point 18 which is reversely connected to the point 19. The shank 15 terminates at one end with an eye 16 for attachment of the hook 10 to a leader.

Figure 2:
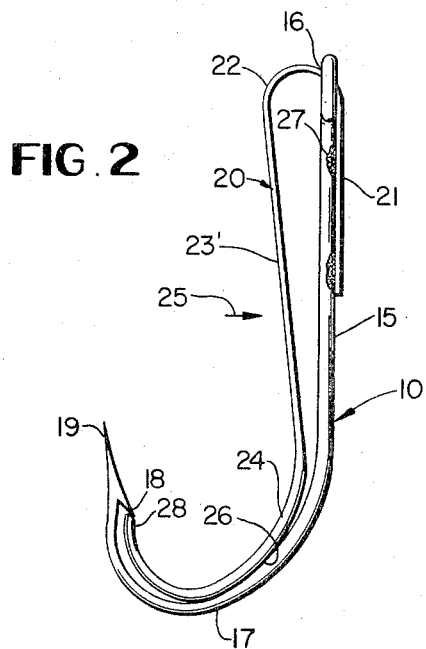
FIG. 2 is a side view of the fishhook showing a flexible spring member in a depressed or operative position for effectively closing the barb of the hook by a rocking motion.
Figure 4:
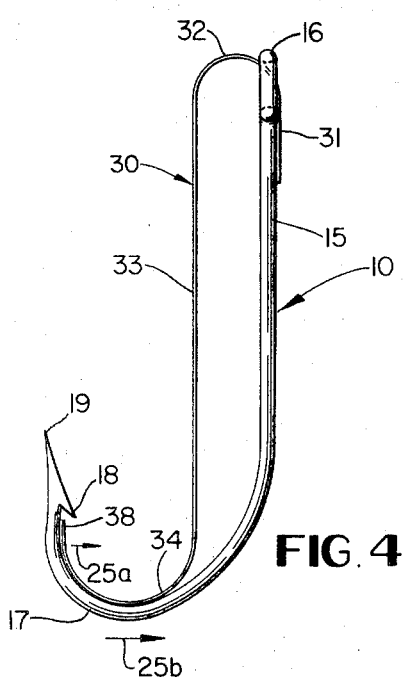
FIG. 4 is a side view of a shankward-slide embodiment of the spring member of this invention which has a straight pressure portion and is attached to a typical fishhook.
Figure 5:
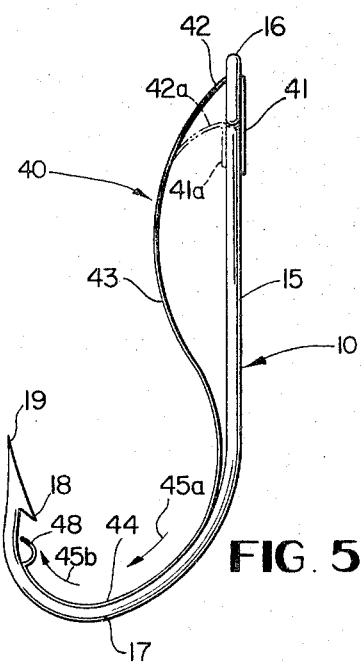
FIG. 5 is a side view of a barbward-slide embodiment of the spring member, which has a curved tip and a recurved pressure portion, attached to a typical fishhook through the eye thereof to the rearward side of the shank and, alternatively in phantom, showing a shorter recurved pressure portion and an attachment portion attached to the frontward or hook side of the fishhook shank.
Figure 6A:
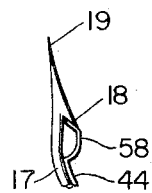
FIG. 6a shows the hook portion of a fishhook in barb-release engagement with an angular tip embodiment of the barb-inactivating device.
Figure 6B:
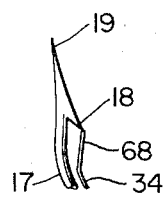
FIG. 6b shows the hook portion of the fishhook in barb-release engagement with a bent tip embodiment of the barb-inactivating device.
Figure 6C:
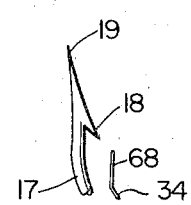
FIG. 6c shows the hook portion of a fishhook and the bent tip embodiment of FIG. 6b in flesh-depressing relationship to the fishhook barb whereby cartilaginous or bone-like material is forcibly removed from the vicinity of the barb and caused to jump over the barb.

Referring particularly to FIGS. 1 and 2, a flexible spring member 20 is attached to the shank 15 near the eye 16. It extends through the eye 16 and curves outwardly of the shank 15 and downward to the bight 17 where it is curved so as to accommodate the inner side of the bight 17, terminating just short of the barb 18. FIGS. 1 and 2 relate to the leverage embodiment 20; FIGS. 4 and 5 relate to sliding embodiments.

The spring member 20 comprises an attachment portion 21, a spring portion 22, a pressure portion 23, a loop or bight portion 24, and a tip 28. Its pressure portion 23 is spaced apart from the shank 15.

Embodiments of the spring member varying in mode of operation according to the shape of the spring and pressure portions are shown in the drawings. FIGS. 1, 2, 3, 4, 5, 8, and 14 show various embodiments of the spring member.

The leverage embodiment 20 shown in FIGS. 1 and 2 has a slightly curved pressure portion 23 and a spring portion 22 with a 180° bend therein. The shankward-sliding embodiment 30 of FIG. 4 has a straight pressure portion 33 and also has a spring portion 32 with an 180° bend therein. The barbward-sliding embodiment 40 shown in FIG. 5 has a recurved pressure portion 43 and a spring portion 42 with a sharp bend therein of approximately 135°.

The shankward-sliding embodiment 30, wherein the loop 34 and the tip 38 are slid in directions 25a and 25b, respectively, toward the shank 15 when pressure is applied as shown in FIG. 4, is suitably equipped with a relatively straight tip 38 which essentially conforms to the bight 17 of the fishhook 10, immediately below the barb 18, and is preferably biassed thereagainst. The tip 28 of the leverage embodiment 20 similarly conforms to the bight 17. These embodiments also perform very satisfactorily when equipped with a bent tip 68 if the shape of the bight 17 reasonably conforms therewith so that the extreme end of the tip 68 does not interfere with the action of the barb 18.

The barbward-sliding embodiment shown in FIG. 5, however, in which the loop porton 44 slides in directions 45a toward the barb 18 in order to close the gap between the barb 18 and the tip 48 which is itself moving in direction 45b when pressure is applied to pressure portion 43, is suitably equipped with a bump-type tip 48, 58 having a plow-like capability with respect to flesh adjacent to the bight 17 of the fishhook 10. Tip 48 is smoothly curved, and tip 58 is angular, but both are able to act as a plow or wedge in lifting flesh away from the shank 17 and beyond the barb 18.

The spring member 20 is preferably of spring steel or other suitable material having adequate strength, stiffness, and elasticity. Attaching the spring member 20 is effected by any suitable means, as by soldering, welding, clipping or tying, for example, its attachment portion 21, 31, 41, 51, to the shank 15 of the fishhook 10.

Figure 7A:
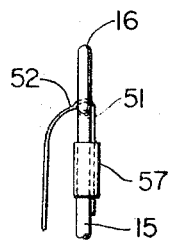
FIG. 7a depicts the shank and eye of a fishhook and the attachment portion of a spring member which passes through the eye and is attached to the shank with a cylindrical clip.
Figure 7B:
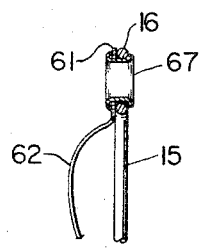
FIG. 7b shows a fishhook shank and eye and a recurved spring member which is attached to the eye with a rivet or circular clip.
Figure 7C:
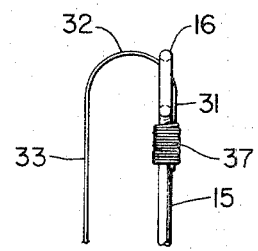
FIG. 7c shows a fishhook shank and eye and a spring member passing through the eye and attached to the shank with a lashing.

Clearly visible welds 27 bind the attaching portion 21 to the shank 15 in FIGS. 1 and 2. A clip 57 holds the attaching portion 51 to the shank 15 as shown in FIG. 7a, and a circular clip or rivet 67 holds a circular attaching portion or base 61 to the eye 16 in FIG. 7b. A lashing 37 holds the attaching portion 31 to the shank 15 in FIG. 7c. The alternative attachment portion 41a of FIG. 5 can be secured to the shank 15 with welds 27, epoxy cement, a clip 57, or a lashing 37, for example.

Figure 3A:
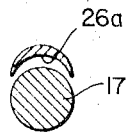
FIG. 3a is a sectional view, looking in the direction of the arrows 3a—3a of FIG. 1, showing the manner in which the spring member, having a new-moon cross section, is accommodated, along the inner side of the bight of the fishhook to which it is attached, for movable engagement with the barb.
Figure 3B:
FIG. 3b is a sectional view of a spring member having a semi-circular cross section.
Figure 3C:
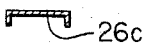
FIG. 3c is a sectional view of a spring member having a channel-shaped cross section.
Figure 3D:
FIG. 3d is a sectional view of a spring member having a flat cross section.
Figure 3E:
FIG. 3e is a sectional view of a spring member having a bridge-shaped cross section.
Figure 3F:
FIG. 3f is a sectional view of a spring member having an angular cross section.
Figure 3G:
FIG. 3g is a sectional view of a spring member having an arcuate cross section.

As shown in FIG. 3a, the loop portion 24 of the hook 10 has a concave mating surface 26a which conforms to the surface of the bight 17. The mating surface 26a is grooved or shaped so as partially to enclose the bight 17 and thus resist sidewise displacement therefrom. The entire inner surface of the loop portion 24 of the spring member 20 may be so grooved, as shown in FIG. 1, but preferably only that portion which contacts the bight and/or bight-shank juncture is grooved to accommodate or engage the curvilinear surface of the hook 10. This groove augments the rigidity imparted by the attachment of the attaching portion 21, 31, 41, 51 to the shank 15. If a relatively long portion 21 is used in combination with a plurality of welds 27 or a lengthy strip of solder or epoxy cement, there is sufficient rigidity that the channel cross section 26c or the flat cross section 26d shown in FIG. 3d is satisfactory. However, if lashings 37 or a circular clip 67 is employed, it is necessary to use a deep groove 26a, 26b, ≈e, 26f, or 26g.

The remaining spring members 70, 140 differ considerably. The side-barb embodiment 70, shown in FIGS. 8 and 8a, acts partly by leverage and partly by sliding as it brings the barbed tip 78 into position beneath the fishhook barb 18, so that the tip 78 nestles against the retention side 18b, as identified in FIG. 13a, when the pressure portion 73 is squeezed into parallelism, indicated as 73', with the shank 15.

The more easily flexed spring member 140, which is shown in FIG. 14, is intended for use with a snell-type fishhook 110. The attachment portion 111 is attached to the curvilinear shank 115 immediately adjacent the eye 116, and the pressure portion 143 generally performs the necessary spring function when squeezed against the shank 115, as indicated at 143', thereby lifting and reversely bending the loop portion 144' so that it is pushed tightly against the retention side of the barb 118 and forms a smoothly curved continuation of the pressure side of the barb 118, corresponding to the pressure side 18c, as indicated in FIG. 13a, whereby flesh is forced to slide smoothly along the loop portion 144' and over the barb 118.

The spring-loaded, leverage-creating member 80, shown in FIG. 9, comprises a hook portion 81 for attaching it to a fishhook 10, a straight spring portion 82 which passes through the eye 16 and is surrounded by a coil spring 85 which is disposed transversely to the shank 15, a rigid pressure portion 83, and a rigid loop portion 84. When the pressure portion 83 is squeezed to position 83', the string portion 82' slides through the eye 16, and the tip 88 is rocked into juxtaposition with the reverse point of the barb 18, corresponding to the extremity 18a as indicated in FIG. 13a. This alignment of the raised loop portion 84', the tip 88', and the pressure surface of barb 18 creates a smoothly curving but continuous bridge along which flesh can be urged by manipulation of the fishhook 10.

The rigid, slidingly-operative embodiment 90, shown in FIGS. 10 and 10a, conforms closely to the surface of the fishhook 10 and is slidingly held in place by any suitable retention means (not shown in the drawings). When the bent spring member 95 (performing as the pressure portion) is squeezed, it straightens and exerts a pulling force on the flexible metal lead 97 whereby the straight sliding portion 93 is lifted so that the tip 98 is moved directly into juxtaposition with the barb 18, thereby providing a continuous bridge for flesh to traverse when forced toward the point 19, over the loop porton 94' and the tip 98'.

The flexible, slidingly operative member 100, shown in FIG. 11, is similar to the member 90, having a sliding portion 103 and a loop portion 104, but lacks a means for converting a squeezing motion into a sliding motion. Sliding is accomplished by manually pushing upon the pair of collars 107a, 107b in direction 105. When the angular tip 108 is thus pushed snugly against the retention side 18b, as indicated in FIG. 13a, a steeply inclined path is provided for retained flesh to jump over the barb point 18a, as indicated in FIG. 13a.

The rigid, slidingly operative member 120, shown in FIG. 12, has a bentover tip 128 and a single, elongated collar 127. When this collar 127 is manually pulled in direction 125, the tip 128 is snugly adjacent to the retention side of the barb 18 and thereby provides a barb-nullifying means.

The semi-flexible member 130 of FIGS. 13 and 13a also lies snugly against the shank 15 and bight 17 of a slightly modified fishhook 10a differing merely by addition of a slot 18d. When the pair of collars 137a, 137b are manually pulled toward the eye 16, the tip 138 is moved toward the barb 18, the tip 138 is engaged by the slot 18d, as shown in detail in FIG. 13a, and the loop 134 is pulled and flexed, as 134', tightly against the retention side 18b of the barb 18 so that flesh is forcibly pushed toward and over the barb 18.

In operation, after a fish is landed or caught, the fisherman, or fisherwoman, simply depresses the spring member 20, as shown in FIG. 2, so as to move the grooved surface 26 of the loop portion 24 of the spring member 20 downwardly along the inner side of the bight 17, thus rocking the tip 28, 38 shankwardly into a closed relationship with the barb 18, thereby occupying the space between the point of the barb 18 and the bight 17, or sliding the tip 48, 58 like a wedge or plow to close up this space.

This operation may be accomplished by various means depending upon the skill of the fisher and whether or not the fish is of the spiny variety. For example, the leader may be grasped in one hand while the other hand is used to depress the spring member and render the barb ineffective. The hook is then gently removed from the flesh of the fish using conventional manipulative techniques, as by rotative or circular movement. When pressure on the spring member is released, the barb is opened to its normal position.

By means of the present invention there is provided a movable member of a fishhook with which the fishhook can be readily removed from a fish without substantial damage to the fish. The invention also provides a fish-preserving fishhook that is simple in construction, inexpensive to manufacture, and adapted to be used efficiently without requiring any special skill on the part of the user.

By using the barb-nullifying spring member of this invention, sportsmen can release undersized fish or fish caught for sport rather than food with minimum harm to the fish. Another feature which adds to the usefulness of the hook includes storage of the hook with the barb in a closed position which may be accomplished by the use of tape or the equivalent. Additionally, the fishhook of the invention may be employed with any artificial bait or lure which uses a barbed hook.

Various changes and modifications may be made in the fishhook as will be apparent to one skilled in the art. Such changes and modifications are considered within the scope and teachings of the invention as defined by the claims.

What is claimed is:

1. The combination of a fishhook, having a shank, an eye at one end of the shank, and a bight leading from the other end of the shank and terminating in a point with a reversely directed barb adjacent thereto, with a barb-nullifying means for closing said barb to render said barb ineffective, said barb-nullifying means comprising a flexible spring member attached to said shank and disposed along said bight to a position spaced from said barb, said flexible spring member comprising a spring portion, a pressure portion spaced from said shank, and a tip spaced from said barb, said tip being movable to a position of closed relationship with said barb when force is applied to said pressure portion to urge said pressure portion toward said shank.

2. As a barb-inactivating device for use in combination with a fishhook having a barb, a bight, a shank, and an eye, a fishhook member comprising:
A. an attachment portion,
B. a loop portion adapted to engage the inner curvilinear surface of said bight,
C. a tip adapted to clear flesh from said barb, and
D. a means for moving said tip into a barbinactivating position, comprising a spring portion of said member in combination with a pressure portion of said member.

3. The fishhook member of claim 2 wherein said tip is rockingly moved into said barb-inactivating position when said pressure portion is manually squeezed.

4. The combination of claim 1, wherein said spring portion has a 180° bend therein, and said flexible spring member further comprises a loop portion, between said tip and said pressure portion, which lies against said bight of said fishhook and is slideably movable therealong.

5. The combination of claim 4, wherein said pressure portion is slightly curved and application of said force leverably rocks said tip shankwardly into said closed relationship.

6. The combination of claim 4, wherein said pressure portion is straight, said tip is biassed against said bight of said fishhook, and application of said force slides said loop portion shankwardly along said bight, whereby said tip moves transversely to said shank of said fishhook into said closed relationship.

7. The combination of claim 1, wherein said spring portion has a bend therein of approximately 135°, said pressure portion is recurved, and said flexible spring member further comprises a loop portion which lies against said bight of said fishhook and is slideably moveable barbwardly therealong when said force is applied to said pressure portion, whereby said tip moves approximately in parallel to said shank of said fishhook toward said position of closed relationship with said barb.

8. The combination of claim 7, wherein said tip is equipped with the bump-type tip having a plow-like capability with respect to flesh adjacent to said bight of said fishhook.

9. The fishhook member of claim 2, wherein said fishhook member further comprises a straight sliding portion conformed closely to the surface of said fishhook, a flexible metal lead attached to said straight sliding portion, and a bent spring member, as said pressure portion, which is attached to said flexible metal lead and to said shank of said fishhook whereby squeezing of said bent spring member toward said shank straightens said bent spring member to exert a pulling force on said flexible metal lead and move said tip directly into juxtaposition with said barb, thereby providing a continuous bridge for said flesh to traverse.

10. The fishhook member of claim 2 wherein said pressure portion has a bend therein of approximately 135°, and squeezing of said pressure portion toward said shank slides said loop portion and said tip barbwardly.

* * * * *